US006026356A

United States Patent [19]

Yue et al.

[11] Patent Number: 6,026,356

[45] Date of Patent: Feb. 15, 2000

[54] METHODS AND DEVICES FOR NOISE CONDITIONING SIGNALS REPRESENTATIVE OF AUDIO INFORMATION IN COMPRESSED AND DIGITIZED FORM

[75] Inventors: H. S. P. Yue, St. Laurent; Rafi Rabipour, Cote St. Luc; Chung-Cheung Chu, Brossard, all of Canada

[73] Assignee: Nortel Networks Corporation, Montreal, Canada

[21] Appl. No.: 08/888,276

[22] Filed: Jul. 3, 1997

[51] Int. Cl.7 ........................ G01L 3/00

[52] U.S. Cl. ........................ 704/201; 704/223

[58] Field of Search ........................ 704/207, 214, 704/219, 220, 222, 223

[56] References Cited

U.S. PATENT DOCUMENTS 5,485,522 1/1996 Solve et al. .............. 381/56

5,642,464 6/1997 Yue et al. .

FOREIGN PATENT DOCUMENTS

PCT/SE94/00027 1/1994 Sweden .

PCT/CA/95/00704 12/1995 WIPO .

WO 96/34382 10/1996 WIPO .

*Primary Examiner*—Emanuel Todd Voeltz

*Assistant Examiner*—M. David Sofocleous

[57] ABSTRACT

The present invention relates to methods and devices for processing data frames representative of audio information in digitized and compressed form. The method comprises the steps of classifying successive data frames into frames containing speech sounds and non-speech sounds, altering parameters of the data frames identified as containing non-speech sounds for eliminating or at least substantially reducing artifacts that distort the acoustic background noise. In addition, the data frame identified as containing non-speech sounds are low-pass filtered. Finally, a signal level compensation is effected to avoid undesired fluctuations in the signal level.

20 Claims, 3 Drawing Sheets

METHODS AND DEVICES FOR NOISE CONDITIONING SIGNALS REPRESENTATIVE OF AUDIO INFORMATION IN COMPRESSED AND DIGITIZED FORM

FIELD OF THE INVENTION

This invention relates to methods and systems for noise conditioning a signal containing audio information. More specifically, the invention pertains to a method for eliminating or at least reducing artifacts that distort the acoustic background noise when linear predictive-type low bit-rate compression techniques are used to process a signal originating in a noisy background condition.

BACKGROUND OF THE INVENTION

In recent years, many speech transmission and speech storage applications have employed digital speech compression techniques to reduce transmission bandwidth or storage capacity requirements. Linear predictive coding (LPC) techniques providing good compression performance are being used in many speech coding algorithm designs, where spectral characteristics of speech signals are represented by a set of LPC coefficients or its equivalent. More specifically, the most widely used vocoders in telephony today are based on the Code Excited Linear Predictive (CELP) vocoder model design. Speech coding algorithms based on LPC techniques have been incorporated in wireless transmission standards including North American digital cellular standards IS-54B and IS-96B, as well as the European global system for mobile communications (GSM) standard.

LPC based speech coding algorithms represent speech signals as combinations of excitation waveforms and a time-varying all pole filter which model effects of the human articulatory system on the excitation waveforms. The excitation waveforms and the filter coefficients can be encoded more efficiently than the input speech signal to provide a compressed representation of the speech signal.

To accommodate changes in spectral characteristics of the input speech signal, conventional LPC based codecs update the filter coefficients once every 10 milliseconds to 30 milliseconds (for wireless telephone applications, typically 20 milliseconds). This rate of updating the filter coefficients has proven to be subjectively acceptable for the characterization of speech components, but can result in subjectively unacceptable distortions for background noise or other environmental sounds.

Such background noise is common in digital cellular telephony because mobile telephones are often operated in noisy environments. In digital telephony applications, far-end users have reported subjectively annoying "swishing" or "waterfall" sounds during non-speech intervals, or report the presence of background noise which "seems to be coming from under water".

The subjectively annoying distortions of noise and environmental sounds can be reduced by attenuating non-speech sounds. However, this approach also leads to subjectively annoying results. In particular, the absence of background noise during non-speech intervals often causes the subscriber to wonder whether the call has been dropped.

Alternatively, the distorted noise can be replaced by synthetic noise which does not have the annoying characteristics of noise processed by LPC based techniques. While this approach avoids the annoying characteristics of the distorted noise and does not convey the impression that the call may have been dropped, it eliminates transmission of background sounds that may contain information of value to the subscriber. Moreover, because the real background sounds are transmitted along with the speech sounds during speech intervals, this approach results in distinguishable and annoying discontinuities in the perception of background sounds at noise to speech transitions.

Another approach involves enhancing the speech signal relative to the background noise before any encoding of the speech signal is performed. This has been achieved by providing an array of microphones and processing the signals from the individual microphones according to noise cancellation techniques so as to suppress the background noise and enhance the speech sounds. While this approach has been used in some military, police and medical applications, it is currently too expensive for consumer applications. Moreover, it is impractical to build the required array of microphones into a small portable headset.

One effective solution to the problem of noise distortions occurring when LPC type codecs are used is presented in the application PCT/CA95/00559 dated Oct. 3, 1995. The solution involves the detection of background noise (or equivalently, the detection of the absence of speech), at which time the parameters of the speech encoder or decoder would be manipulated in order to emulate the effect of an LPC analysis using a very long analysis window (typically this window may be in the order of 400 milliseconds or 20 times the typical analysis window). This process is supplemented with a low-pass filter designed to compensate for the slow roll-off of the LPC synthesis filter when the input signal consists of broadband noise.

While this procedure is very effective in dealing with background noise artifacts, it does assume access to either the speech encoder or the speech decoder. However, there are cases where it would be desirable to apply this background noise conditioning procedure, with access limited to the compressed bit stream only. One such example is a point-to-point telephone connection between two digital cellular mobile telephones. Normally, in this type of connections the speech signal undergoes two stages of speech coding in each direction, causing degradation of the signal. In the interest of improved sound quality, it is desirable to remove the speech decoder/speech encoder pair operating at each of the base-stations servicing the two mobile sets. This can be achieved by using a bypass mechanism that is described in the international patent application PCT/CA95/00704 dated Dec. 13, 1995. The contents of this application are incorporated herein by reference. The basic idea behind this approach is the provision of digital signal processors including a codec and a bypass mechanism that is invoked when the incoming signal is in a format compatible with the codec. In use, the digital signal processor associated with the first base station that receives the RF signal from a first mobile terminal determines, through signaling and control that a compatible digital signal processor exists at the second base station associated with the mobile terminal at which the call is directed. The digital signal processor associated with the first base station rather than synthesizing the compressed speech signals into PCM samples invokes the bypass mechanism and outputs the compressed speech in the transport network. The compressed speech signal, when arriving at the digital signal processor associated with the second base station is routed such as to bypass the local codec. Decompression of the signal occurs only at the second mobile terminal.

In this network configuration, background noise conditioning at the base-station or at any point in the transmission link connecting the two base stations during the given call is only possible through the manipulation of the compressed bitstream transported between the two base-stations. An obvious approach to the solution of this problem would be to apply the noise conditioning technique described in U.S. Pat. No. 5,642,464 using the compressed bit stream, synthesize speech signal based on the filter coefficients and compress the resulting signal using another stage of speech encoding. This, however, would be equivalent to a tandemed connection of speech codecs that as pointed out earlier is undesirable because it causes additional degradation of the input signal.

Against this background, it clearly appears that a need exists in the industry to provide novel methods and systems allowing to condition signals representative of audio information in digitized and compressed form in order to remove noise artifacts or other undesirable elements from the signal, without the need for accessing the speech encoder or the speech decoder stages of the communication link.

OBJECTS AND STATEMENT OF THE INVENTION

An object of this invention is to provide a novel method and apparatus for conditioning a noise signal representative of audio information in digitized and compressed form.

Another object of this invention is to provide a novel communication system incorporating the aforementioned apparatus for conditioning a noise signal representative of audio information in digitized and compressed form.

Another object of this invention is to provide a method and apparatus for processing a signal representative of audio information in digitized and compressed form to attenuate spectral components in the signal above a certain threshold while limiting the occurrence of undesirable fluctuations in the signal level.

In this specification, the term "Coefficients segment" is intended to refer to any set of coefficients that uniquely defines a filter function which models the human articulatory tract. In conventional vocoders, several different types of coefficients are known, including reflection coefficients, arcsines of the reflection coefficients, line spectrum pairs, log area ratios, among others. These different types of coefficients are usually related by mathematical transformations and have different properties that suit them to different applications. Thus, the term "Coefficients segment" is intended to encompass any of these types of coefficients.

The term "excitation segment" can be defined as information that needs to be combined with the coefficients segment in order to provide a representation of the audio signal in a non-compressed form. Such excitation segment may include parametric information describing the periodicity of the speech signal, an excitation signal as computed by the encoder stage of the codec, speech framing control information to ensure synchronous framing between codecs, pitch periods, pitch lags, energy information, gains and relative gains, among others. The coefficients segment and the excitation segment can be represented in various ways in the signal transmitted through the network of the telephone company. One possibility is to transmit the information as such, in other words a sequence of bits that represents the values of the parameters to be communicated. Another possibility is to transmit a list of indices that do not convey by themselves the parameters of the signal, but simply constitute entries in a database or codebook allowing the decoder stage of the remote codec to look-up this database and extract on the basis of the various indices received the pertinent information to construct the signal.

The expression "Data frame" will refer to a group of bits organized in a certain structure or frame that conveys some information. Typically, a data frame when representing a sample of audio signal in compressed form will include a coefficients segment and an excitation segment. The data frame may also include additional elements that may be necessary for the intended application.

The term "LPC coefficients" refers to any type of coefficients which are derived according to linear predictive coding techniques. These coefficients can be represented under various forms and include but are not limited to "reflection coefficients", "LPC filter coefficients", "line spectral frequency coefficients", "line spectral pair coefficients", etc.

In conventional LPC speech processing systems, the annoying "swishing" or "waterfall" effects are probably due to inaccurate modeling of the noise intervals which have relatively low energy or relatively flat spectral characteristics. The inaccuracies in modeling may manifest themselves in the form of spurious bumps or dips in the frequency response of the LPC synthesis filter derived from LPC coefficients derived in the conventional manner. Reconstruction of noise intervals using a rapid succession of inaccurate LPC synthesis filters may lead to unnatural modulation of the reconstructed noise.

The present invention provides a novel signal processing apparatus that includes a noise conditioning device capable of substantially eliminating or at least reducing the perception of artifacts present in the data frames containing non-speech sounds by conditioning the coefficients segment in those data frames, such as by re-computing the coefficients segments based on a much longer analysis windows.

In one embodiment, the noise conditioning device will perform an analysis over the N (typically, N may have a value of 19 for a 20 ms speech frame) previous data frames to derive a coefficients segment that will be used to replace the original coefficients segment of the data frame that is currently being processed Under this embodiment, the noise conditioning device calculates a weighted average of the individual coefficients in the current data frame and the previous N data frames. By performing the analysis over a much longer window of the input signal samples, artifacts which are likely to be present as a result of modeling over short windows, will be eliminated or at least substantially reduced.

Synthesis filters derived from LPC coefficients calculated in the conventional manner fail to roll off at high frequencies as sharply as would be required for a good match to noise intervals of the input signal. This shortcoming of the synthesis filter makes the reconstructed noise intervals more perceptually objectionable, accentuating the unnatural quality of the background sound reproduction. It is beneficial when processing the background sounds to attenuate the reconstructed signal frequencies above a certain threshold, say 3500 Hz by low pass filtering at an appropriate point. In a specific example, a low pass filter is used to alter the coefficients segment of the data frame containing non-speech sounds. Objectively, the application of this technique may result in changes in the prediction gain of the LPC filter, causing undesired fluctuations in the synthesized signal level. This can be remedied by measuring the resultant change in signal level and applying a correction factor to the quantized signal energy information (the quantization index is part of the excitation segment), quantize the scale energy information and the quantization index, and re-inserting those bits into the data frame. Preferably, the change to the signal level resulting from the low pass filter emulation is effected by calculating the DC component of its frequency response before and after the filtering operation and comparing the two signals to assess the change effected on the signal level. The appropriate correction is then implemented. Alternatively, it is possible to estimate the signal level change by calculating the difference in the prediction gains of the two filters.

DESCRIPTION OF A PREFERRED EMBODIMENT

Figure 1:
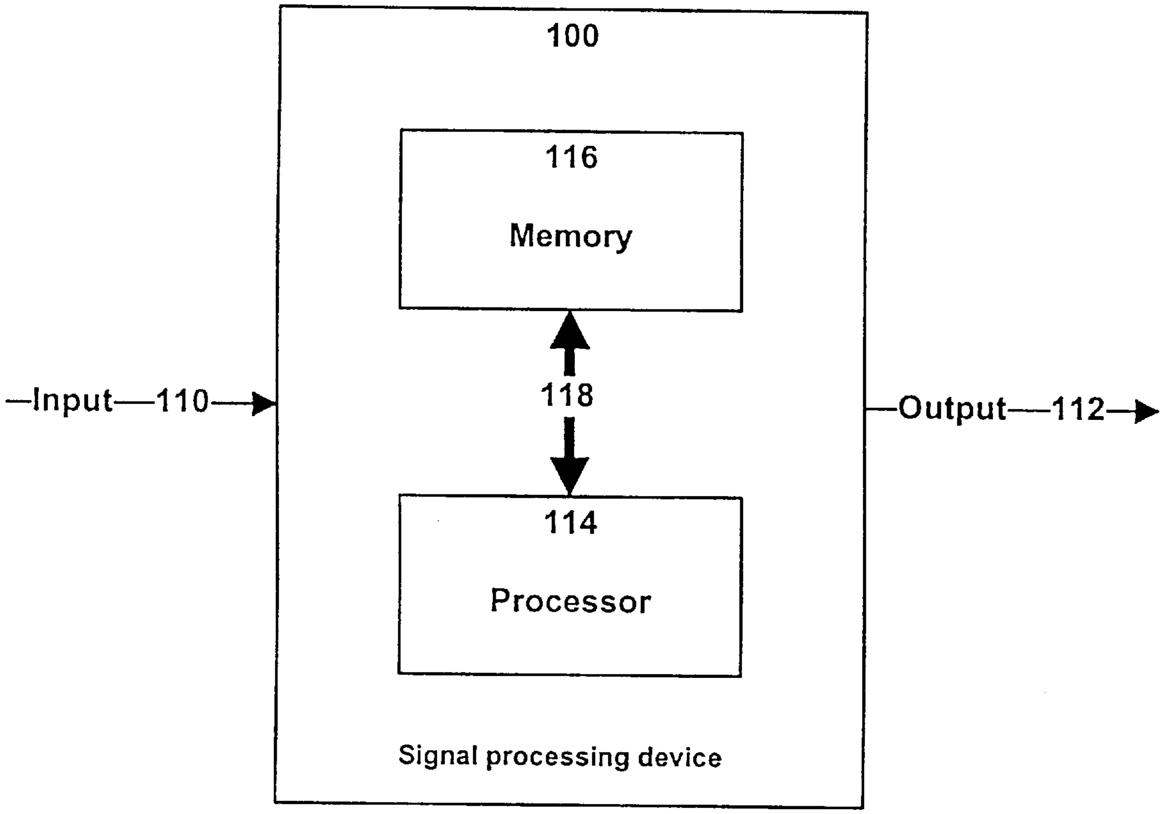
FIG. 1 is a block diagram of an apparatus used to implement the invention in a speech transmission application.

FIG. 1 is a block schematic diagram of an apparatus 100 used to implement the invention in a speech transmission application. The apparatus comprises an input signal line 110, a signal output line 112, a processor 114 and a memory 116. The memory 116 is used for storing instructions for the operation of the processor 114 and also for storing the data used by the processor 114 in executing those instructions.

Figure 2:
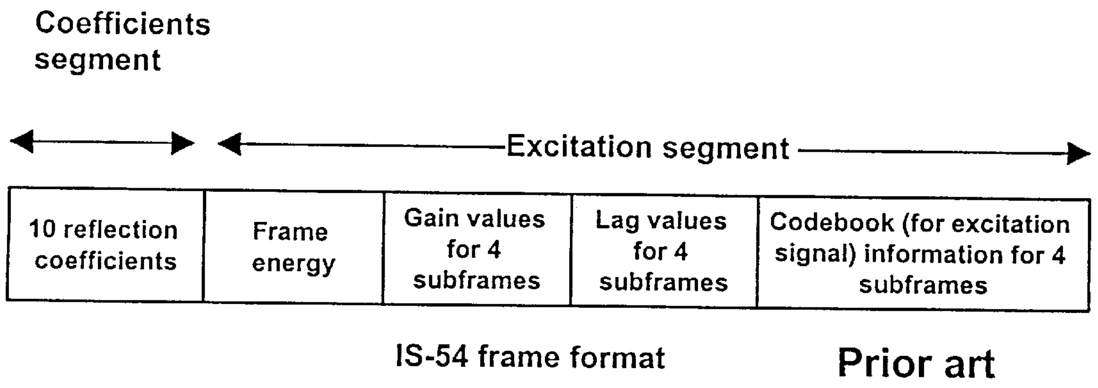
FIG. 2 illustrates a frame format of a data frame generated by the encoder stage of a LPC vocoder.
Figure 4:
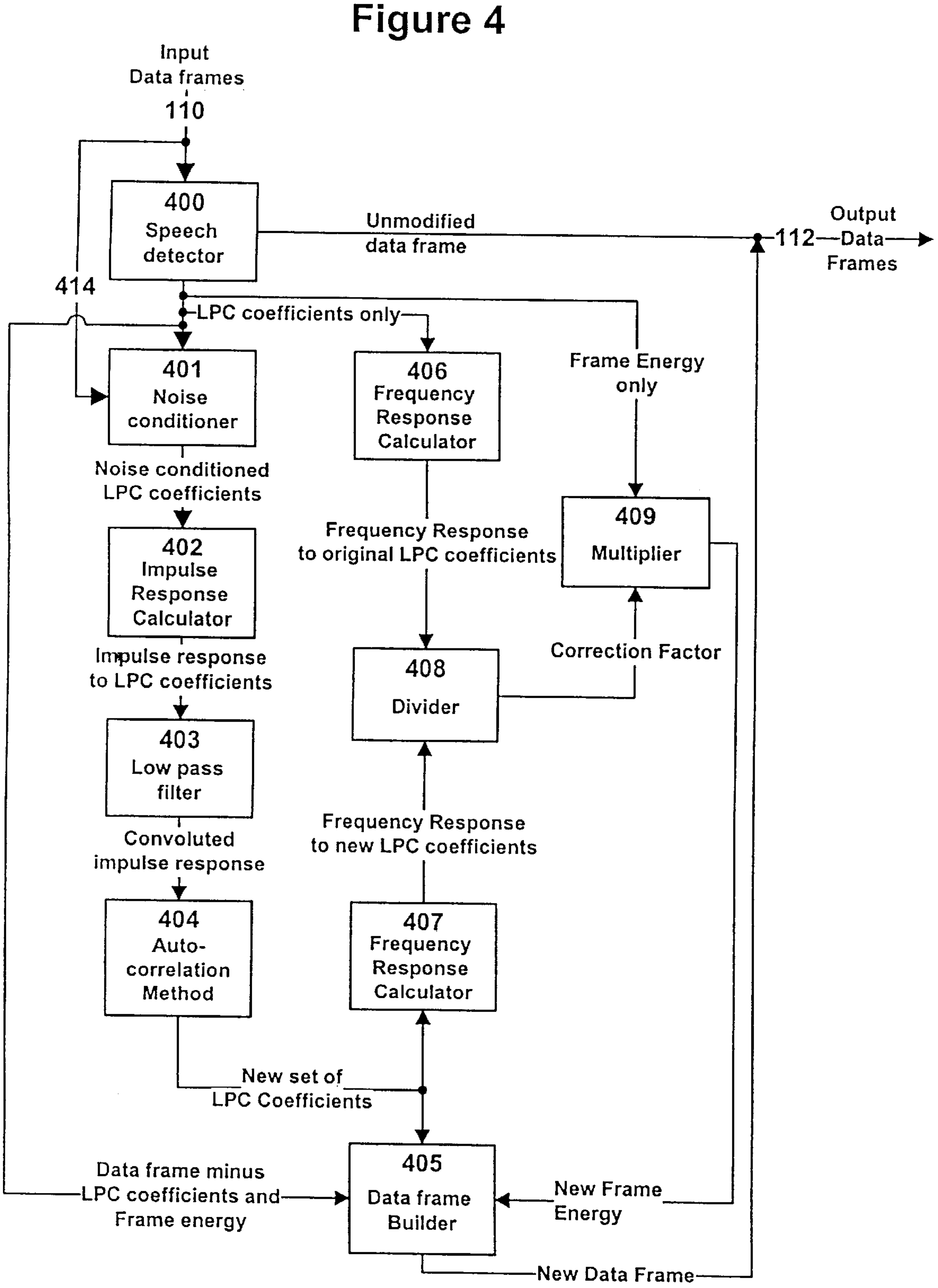
FIG. 4 is a functional diagram of a signal processing device constructed in accordance with the invention.

FIG. 4 is a functional diagram of the signal processing device 100, illustrated as an assembly of functional blocks. In short, the signal processing device receives at the input 110 data frames representative of audio information in compressed digitized form including a coefficients segment and an excitation segment. In a specific example, the data frames may be organized under a IS-54 frame format of the type illustrated in FIG. 2.

The stream of incoming data frames are analyzed in real time by a speech detector 400 to determine the contents of every data frame. If a data frame is declared as one containing speech sounds it is passed directly to the output line 112, without modification to its coefficients segment nor the excitation segment. However, if the data frame is found to contain non-speech sounds, in other words only background noise, the speech detector 400 directs specific parts of the data frame to different components of the signal processing device 100.

The speech detector 400 may be any of a number of known forms of speech detector that is capable of distinguishing intervals in the digital speech signal which contain speech sounds from intervals that contain no speech sounds. Examples of such speech detectors are disclosed in Rabiner et al. "An algorithm for determining the end points of isolated utterances", Bell System technical journal, Volume 54, No 2, February 1975. The contents of this document are incorporated herein by reference. Most preferably, the speech detector 400 operates on the coefficients segment and the excitation segment of the data frame to determine whether it contains speech sounds or non-speech sounds. Generally speaking, it is preferred not to synthesize an audio signal from the data frame to make the speech/non-speech sounds determination in order to reduce complexity and cost.

If the incoming data frame is found by the speech detector 400 to contain non-speech sounds, it is transferred to a noise conditioning block 401 designed to alter the coefficients segment of that data frame for removing or at least reducing artifacts that may distort the acoustic background noise. The noise conditioning block 401 may operate according to two different embodiments. One possibility is to implement the functionality of a long analysis window to generate a new set of LPC coefficients established over a much longer signal interval. This may be effected by synthesizing an audio signal based on the current data frame and a number of N previous data frames. Typically, N may have a value of 19 for a 20 ms speech frame. Such long analysis LPC window has been found to function well in reducing the background noise artifacts. Another possibility is to calculate a new set of LPC coefficients based on an average effected between the coefficients of the current frame and the coefficients of a number of previous frames. For a 20 ms speech frame, that number may, for example, also be 19. The coefficients averaging may be defined by the following equation:

$$X(j,n)=\left(\frac{1}{N}\right)\sum_{i=0}^{N-1}[w(i)\cdot x(j,n-i)]$$

where X(j,n) is the $j^{th}$ component of the LPC coefficients set for the $n^{th}$ data frame, N is the total number of data frames over which the averaging is made and w(i) is a weighing factor between zero and unity. A new set of LPC filter coefficients is then derived.

Since the noise conditioning block 401 operates on the current data frame and also on the previous data frames in order to calculate a noise conditioned set of LPC coefficients, a link 414 is established between the input 110 and the noise conditioning block 401. The data frames that are successively presented at the input 110 are transferred over to the noise conditioning block 401 over that data link. The equation for the synthesis filter at the output of the noise conditioner is of the form:

$$y(n)=a_1y(n-1)+a_2y(n-2)+\ldots+a_py(n-p)+a_ox(n)$$

where $a_o$ to $a_p$ are the LPC filter coefficients, p is the order of the model (a typical value is 10) and x(n) is the prediction error.

The noise conditioned set of LPC coefficients computed at the noise conditioner 401 are transferred to an impulse response calculator 402. The output of the impulse response calculator is the impulse response of the noise conditioned LPC coefficients and is of the following form:

$$h(n)=a_1h(n-1)+a_2h(n-2)+\ldots+a^{12}{}_ph(n-p)+\delta(n).$$

where δ(n) is the Dirac function.

The impulse response of the noise conditioned LPC coefficients is then input to a low pass filter 403. The low pass filter 403 is used to condition the coefficients segment of the data frame to compensate for an undesirable behavior of the synthesis filter that may be used at some point in reconstructing an audio signal from the data frame, namely in the decoder stage of a mobile terminal. It is known that such synthesis filters do not roll-off fast enough particularly at the high end of the spectrum. This has been determined to further contribute to the degradation of the background noise reproduction. One possibility in avoiding or at least partially reducing this degradation is to attenuate the spectral components in the data frame above a certain threshold. In a specific example, this threshold may be 3500 Hz.

In the low pass filter 403, the impulse response of the noise conditioned LPC coefficients is convoluted with the impulse response of the low-pass filter g(n) and an output of the following form is produced:

$$\hat{h}(n)=g(n)*h(n)$$

Note that the order in which the impulse response calculation and the low pass filtering are performed may be reversed since linear time invariant filtering operations are commutative.

In a specific example, this output is the filter synthesis equation for an 11-pole filter (the filter has 11 poles). Before these coefficients are re-inserted in the data frame, they are converted to an equivalent representation with only 10 LPC filter coefficients. This is done by the auto-correlation method block 404. The auto-correlation method is a mathematical manipulation which is well known to a man skilled in the art. It will therefore not be described in detail here. The output to the auto-correlation block is then a new set of 10 LPC coefficients which will be converted to the original format and forwarded to the data frame builder 405. These new data bits will be concatenated with the other parts of the data frame and forwarded to the output 112 of the signal processing device 100.

The excitation segment combined with the low pass filtered LPC coefficients form a data frame that has much less background noise distortion by comparison to the data frame when it was input to the noise conditioning block 401.

Since the shape of the spectrum has been changed, the frame energy portion of the excitation segment needs to be adjusted. This adjustment is performed by multiplying the frame energy with a correction factor. A method for obtaining the required correction factor is to calculate the DC component of the frequency response (i.e. at ω=0) for both the original LPC coefficients and the new LPC coefficients and then divide them. A more detailed procedure for obtaining the correction factor is described below.

The original set of LPC coefficients are input to a frequency response calculator 406 which calculates the frequency response to the original LPC coefficients at ω=0.

The frequency response to the original LPC coefficients is expressed as follows:

$$H(\omega)=\frac{1}{1-a_1e^{-j\omega}-a_2e^{-j\omega 2}-\ldots-a_pe^{-j\omega p}}$$

In the same manner, the new set of LPC coefficients is input to a frequency response calculator 407 and the frequency response at ω=0 for the new LPC coefficients is produced. The frequency response of the new LPC coefficients is expressed as:

$$G(\omega)=\frac{1}{1-a'_1e^{-j\omega}-a'_2e^{-j\omega 2}-\ldots-a'_pe^{-j\omega p}}$$

The correction factor is then obtained by dividing the frequency responses obtained earlier in a divider 408. The output of the divider is the correction factor and is of the form:

$$\left.\frac{H(\omega)}{G(\omega)}\right|_{\omega=0}=\frac{1-a'_1-a'_2-\ldots-a'_p}{1-a_1-a_2-\ldots-a_p}$$

This correction factor can now be multiplied by the frame energy data in the multiplier 409. The output of the multiplier is a new frame energy value and it is input to the data frame builder 405 where it will be concatenated with the new set of LPC coefficients and the remainder of the data frame.

Figure 3:
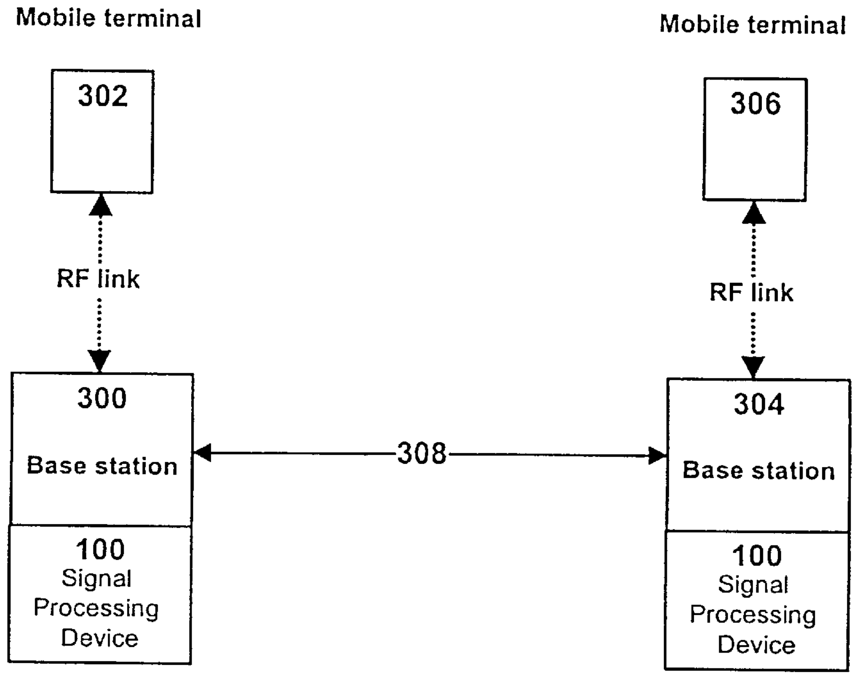
FIG. 3 is a simplified block diagram of a communication link between two mobile terminals.

The signal processing device as described above is particularly useful in communication links of the type illustrated at FIG. 3. Those communication links are typical for calls established from one mobile terminal to another mobile terminal and include a first base station 300 that is connected through an RF link to a first mobile terminal 302, a second base station 304 connected through a RP link to a second mobile terminal 306, and a communication link 308 interconnecting the base stations 300 and 304. The communication link may comprise a conductive transmission line, an optical transmission line, a radio link or any other type of transmission path. When a call is initiated from say mobile terminal 302 towards mobile terminal 306, the codec at the mobile terminal 302 receives the audio signal and compresses the signal intervals into data frames constructed in accordance with the frame shown at FIG. 2. Of course, other frame formats can also be used without departing from the spirit of the invention. These data frames are then transported through the base station 300, the communication link 308. and the base station 304 toward mobile terminal 306 without effecting any de-compression of the data frame in base stations 300 and 304 and components on communication link 308 The data frame is de-compressed only by the decoder stage of the codec in the mobile terminal 306 to produce audible speech.

The ability of the signal processing device 100 to operate on data frames without effecting any de-compression of those identified to contain speech sounds is particularly advantageous for such communication links because the quality of the voice signals is preserved. As mentioned earlier, any de-compression of the data frames identified to contain speech sounds in order to perform noise conditioning and/or low pass filtering may not be fully beneficial because the de-compression and the subsequent re-compression stage will have the effect of degrading voice quality.

The above description of a preferred embodiment should not be interpreted in any limiting manner since variations and refinements can be made without departing from the spirit of the invention. The scope of the invention is defined in the appended claims and their equivalents.

We claim:

1. A signal processing apparatus, comprising:

a) an input for receiving a signal derived from audible sound, the signal conveying a plurality of successive data frames, each data frame being representative of audio information in digitized and compressed form, each data frame including:
   a coefficient segment;
   an excitation segment;

b) an output;

c) a detector coupled to said input for distinguishing data frames containing speech sounds from data frames containing non-speech sounds;

d) a noise conditioning device;

e) a selector device capable of acquiring two operative conditions, namely a first operative condition and a second operative condition, said selector device being responsive to said detector for switching between the two operative conditions, when said detector distinguishes a data frame as containing speech sounds said selector acquiring the first operative condition, in said first operative condition said selector device causing transfer of a data frame to said output substantially without altering the coefficient segment of the data frame, when said detector distinguishes a data frame as containing non-speech sounds said selector acquiring the second operative condition, to transfer the data frame to said noise conditioning device, said noise conditioning device being operative for processing the coefficient segment of the data frame received by the noise conditioning device in dependence upon parameters of preceding data frames applied to said input to derive a noise conditioned coefficient segment, the noise conditioned coefficient segment having an impulse response being characterized by a first frequency domain behavior, said noise conditioning device being further operative for low pass filtering the impulse response of the noise conditioned coefficient segment to derive an output coefficient segment having an impulse response characterized by a second frequency domain behavior different from said first frequency domain behavior, said noise conditioning device being further operative to transfer the output coefficient segment to said output.

2. A signal processing apparatus as defined in claim 1, wherein said noise conditioning device further comprises:

a noise conditioning unit for processing a coefficient segment of the data frame received by the noise conditioning device to derive a noise conditioned coefficient segment;

an impulse response computing unit for processing said noise conditioned coefficient segment to derive the impulse response characterized by the first frequency domain behavior;

a low-pass filter for low pass filtering the impulse response characterized by a first frequency domain behavior to derive the impulse response characterized by the second frequency domain behavior;

an auto-correlation unit for processing the impulse response characterized by the second frequency domain behavior to derive the output coefficient segment.

3. A signal processing apparatus as defined in claim 2, wherein said low pass filter is operative to process the impulse response characterized by the first frequency domain behavior for attenuating frequencies above a certain threshold in the impulse response characterized by the first frequency domain behavior to derive the impulse response characterized by the second frequency domain behavior.

4. A signal processing apparatus as defined in claim 3, wherein said certain threshold is about 3500 Hz.

5. A signal processing apparatus as defined in claim 1, wherein the data frame includes a data element indicative of a signal energy, said noise conditioning device comprises a signal level correction unit for selectively altering the data element indicative of a signal energy.

6. A signal processing apparatus as defined in claim 5, wherein said signal level correction unit is operative for comparing the coefficient segment received by the noise conditioning device and the output coefficient segment to derive a correction factor, the correction factor being indicative of a degree of variation between the coefficient segment received by the noise conditioning device and the output coefficient segment.

7. A signal processing apparatus as defined in claim 6, wherein said signal level correction unit alters the data element indicative of a signal energy on a basis of the correction factor.

8. A signal processing apparatus as defined in claim 1, wherein said noise conditioning device is operative for calculating a noise conditioned coefficient segment on a basis of the coefficient segments of preceding data frames applied to said input.

9. A signal processing apparatus as defined in claim 8, wherein number of said preceding data frames is about 19.

10. A signal processing apparatus as defined in claim 1, wherein said noise conditioning device processes the data frame containing non-speech sounds substantially without synthesizing an audio signal conveyed by the data frame.

11. A signal processing apparatus as defined in claim 1, wherein said apparatus is suitable for use in a radio frequency communication system comprising:

a first mobile terminal;

a second mobile terminal;

a base station functionally associated to said first mobile terminal and said second mobile terminal.

12. A method for serially reducing background noise artifacts in a signal derived from audible sound, the signal conveying a succession of data frames, each data frame being representative of audio information in digitized and compressed form, each data frame including a coefficient segment and an excitation segment, said method comprising:

a) receiving the signal derived from audible sound;

b) classifying each data frame in the signal as containing either one of speech sounds and non-speech sounds;

c) transferring the data frames classified as containing speech sounds to an output;

d) processing each frame classified as containing non-speech sounds to alter the coefficient segment thereof in dependence of coefficient segments of preceding data frames to effect a reduction in background noise artifacts in the frame classified as containing non-speech sounds to derive a noise conditioned coefficient segment, the noise conditioned coefficient segment having an impulse response being characterized by a first frequency domain behavior;

e) low pass filtering the impulse response characterized by the first frequency domain behavior of the noise conditioned coefficient segment to derive an output coefficient segment having an impulse response characterized by a second frequency domain behavior different from said first frequency domain behavior;

f) upon completion of the processing at steps d and e, transferring the data frame with an output coefficient segment to said output.

13. A method as defined in claim 12, wherein the data frame includes a data element indicative of a signal energy, said method further comprising selectively altering the data element indicative of a signal energy.

14. A method as defined in claim 13, further comprising comparing the coefficient segment of the frame classified as containing non-speech sounds and the output coefficient segment to derive a correction factor, the correction factor being indicative of a degree of variation between the coefficient segment of the frame classified as containing non-speech sounds and the output coefficient segment.

15. A method as defined in claim 14, the data element indicative of a signal energy is altered on a basis of the correction factor.

16. A method as defined in claim 12, comprising calculating a new coefficient segment for a data frame classified as containing non-speech sounds on a basis of coefficient segments of preceding data frames.

17. A method as defined in claim 16, comprising:

calculating an average of the coefficient segments in the current data frame classified as containing non-speech sounds and the preceding data frames;

replacing the coefficient segment of the current data frame classified as containing non-speech sounds with the average of coefficient segments.

18. A method as defined in claim 12, further comprising:

processing the noise conditioned coefficient segment to derive the impulse response characterized by the first frequency domain behavior;

processing the impulse response characterized by the second frequency domain behavior on the basis of an auto-correlation computation to derive the output coefficient segment.

19. A method as defined in claim 12, wherein low pass filtering the impulse response characterized by the first frequency domain behavior of the noise conditioned coefficient segment attenuates frequencies above a certain threshold in an audio signal synthesized on the basis of the data frame.

20. A communication system including:

a) an encoder including an input for receiving a signal derived from audible sound, said encoder being operative to convert the signal into a succession of data frames representative of audio information in digitized and compressed form, each data frame including a coefficient segment and an excitation segment;

b) a decoder remote from said encoder, said decoder including an input for receiving data frames representative of audio information in digitized and compressed form to convert the data frames into an audio signal;

c) a communication path between said encoder and said decoder, said communication path allowing data frames generated by said encoder to be transported to the input of said decoder;

d) a signal processing apparatus in said communication path for reducing background noise artifacts in data frames transported from said encoder toward said decoder, said signal processing apparatus comprising:

an input for receiving the succession of data frames from said encoder;

an output for issuing a succession of data frames toward the input of said decoder;

a detector coupled to the input of said signal processing apparatus for distinguishing data frames containing speech sounds from data frames containing non-speech sounds;

a noise conditioning device;

a selector device capable of acquiring two operative conditions, namely a first operative condition and a second operative condition, said selector device being responsive to said detector for switching between the two operative conditions, when said detector distinguishes a data frame as containing speech sounds said selector acquiring the first operative condition, in said first operative condition said selector device causing transfer of a data frame to said output substantially without altering the coefficient segment of the data frame, when said detector distinguishes a data frame as containing non-speech sounds said selector acquiring the second operative condition, to transfer the data frame to said noise conditioning device, said noise conditioning device being operative for processing the coefficient segment of the data frame received by the noise conditioning device in dependence upon parameters of preceding data frames applied to said input to derive a noise conditioned coefficient segment, the noise conditioned coefficient segment having an impulse response being characterized by a first frequency domain behavior, said noise conditioning device being further operative for low pass filtering the impulse response of the noise conditioned coefficient segment to derive an output coefficient segment having an impulse response characterized by a second frequency domain behavior different from said first frequency domain behavior, said noise conditioning device being further operative to transfer the output coefficient segment to said output.

* * * * *